(12) United States Patent
Umberhocker et al.

(10) Patent No.: US 11,379,349 B2
(45) Date of Patent: Jul. 5, 2022

(54) VERIFIABLE TESTCASE WORKFLOW

(71) Applicant: International Business Machines Corporation, Armonk, NY (US)

(72) Inventors: Ann Barnette Umberhocker, Cedar Park, TX (US); Ariba Siddiqui, Cedar Park, TX (US); Sowmya Janakiraman, Leander, TX (US); George Conerly Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 16/733,796

(22) Filed: Jan. 3, 2020

(65) Prior Publication Data

US 2021/0209012 A1 Jul. 8, 2021

(51) Int. Cl.
  *G06F 11/36* (2006.01)
  *H04L 9/06* (2006.01)
  *G06F 21/57* (2013.01)

(52) U.S. Cl.
  CPC ...... *G06F 11/3688* (2013.01); *G06F 11/3696* (2013.01); *G06F 21/57* (2013.01); *H04L 9/0637* (2013.01); *H04L 9/0643* (2013.01); *H04L 2209/38* (2013.01)

(58) Field of Classification Search
  CPC . H04L 2209/38; H04L 9/0637; H04L 9/0643; G06F 11/3688; G06F 11/3696; G06F 21/57
  See application file for complete search history.

(56) References Cited

U.S. PATENT DOCUMENTS

| 7,653,893 | B2 | 1/2010 | Neumann et al. |
| 7,954,095 | B2* | 5/2011 | Archer ................ G06F 11/3495 717/149 |
| 10,289,409 | B2 | 5/2019 | Mandava et al. |
| 2006/0010429 | A1* | 1/2006 | Ihara ................... G06F 11/3684 717/126 |

(Continued)

OTHER PUBLICATIONS

Winter et al., "The PECOS software process." Workshop on Components-based Software Development Processes, ICSR. vol. 7. 2002.

(Continued)

*Primary Examiner* — Wei Y Zhen
*Assistant Examiner* — Amir Soltanzadeh
(74) *Attorney, Agent, or Firm* — Patterson + Sheridan, LLP

(57) ABSTRACT

Verifiable test case workflow is provided by creating a secure database for actions taken regarding a source file that is stored on a first computer; creating a test executable from one or more source files and storing it on the first computer; finalizing the source file for test on a second computer different from the first computer; hashing a test environment related to the source file and the second computer; and in response to determining that a version of the test executable provided to the second computer matches a version of the test executable provided to the secure database: executing the test executable on the second computer; hashing test results from testing the source file on the second computer; and adding the test executable as hashed and the test results as hashed to the secure database to actions already stored in the secure database.

17 Claims, 5 Drawing Sheets

(56) References Cited

U.S. PATENT DOCUMENTS

| | | | |
|---|---|---|---|
| 2006/0070048 A1* | 3/2006 | Li | G06F 11/3676 |
| | | | 717/144 |
| 2010/0100872 A1* | 4/2010 | Mitra | G06F 11/3688 |
| | | | 717/125 |
| 2014/0245264 A1* | 8/2014 | Bartley | G06F 11/368 |
| | | | 717/124 |
| 2017/0060713 A1* | 3/2017 | Wang | G06F 16/2455 |
| 2018/0189732 A1 | 7/2018 | Kozloski et al. | |
| 2019/0052551 A1 | 2/2019 | Barczlynski et al. | |
| 2019/0130114 A1* | 5/2019 | Smith | G06F 21/60 |
| 2019/0303623 A1* | 10/2019 | Reddy | G06F 11/3692 |
| 2020/0142693 A1* | 5/2020 | Neugschwandtner | |
| | | | H04L 9/0637 |

OTHER PUBLICATIONS

Shafique et al., "A Systematic Review of Model Based Testing Tool Support", Carleton University, Technical Report SCE-10-04 May 2010.

Winkler, "Integration of Analytical Quality Assurance Methods into Agile Software Construction Practice." Vienna University of Technology, Institute of Software Technology (2006).

Damiani et al., "Test based security certifications." Open Source Systems Security Certification. Springer, Boston, MA, 2009. 1-35.

Bacic,"The Canadian trusted computer product evaluation criteria." [1990] Proceedings of the Sixth Annual Computer Security Applications Conference. IEEE, 1990.

\* cited by examiner

VERIFIABLE TESTCASE WORKFLOW

BACKGROUND

During software development, among other computerized activities, continuous testing and verification is performed to ensure the robustness of the end product or service. The various steps in the testing and verification process are logged for later confirmation (e.g., as part of a security or compliance audit); however, logs can be manipulated or faked—leading to inaccurate or unreliable logs of the actions taken (or not taken) and the user who performed (or failed to perform) various sub-tasks.

SUMMARY

According to one embodiment of the present invention, a method is provided that includes: creating a secure database for actions taken regarding a source file that is stored on a first computer; creating a test executable from one or more source files and storing it on the first computer; finalizing the source file for test on a second computer different from the first computer; hashing a test environment related to the source file and the second computer; and in response to determining that a version of the test executable provided to the second computer matches a version of the test executable provided to the secure database: executing the test executable on the second computer; hashing test results from testing the source file on the second computer; and adding the test executable as hashed and the test results as hashed to the secure database to actions already stored in the secure database.

According to one embodiment of the present invention, a system is provided that includes: a processor; and a memory storage device, including instructions that when executed by the processor perform an operation including: creating a secure database for actions taken regarding a source file that is stored on a first computer; creating a test executable from one or more source files and storing it on the first computer; finalizing the source file for test on a second computer different from the first computer; hashing a test environment related to the source file and the second computer; and in response to determining that a version of the test executable provided to the second computer matches a version of the test executable provided to the secure database: executing the test executable on the second computer; hashing test results from testing the source file on the second computer; and adding the test environment as hashed and the test results as hashed to the secure database to actions already stored in the secure database.

According to one embodiment of the present invention, a computer-readable storage device having computer-readable program code embodied therewith, the computer-readable program code executable by a computer processor to: create a secure database for actions taken regarding a source file that is stored on a first computer; create a test executable from one or more source files and storing it on the first computer; finalize the source file for test on a second computer different from the first computer; hash a test environment related to the source file and the second computer; and in response to determining that a version of the test executable provided to the second computer matches a version of the test executable provided to the secure database: execute the test executable on the second computer; hash test results from testing the source file on the second computer; and add the test environment as hashed and the test results as hashed to the secure database to actions already stored in the secure database.

DETAILED DESCRIPTION

Figure 1:
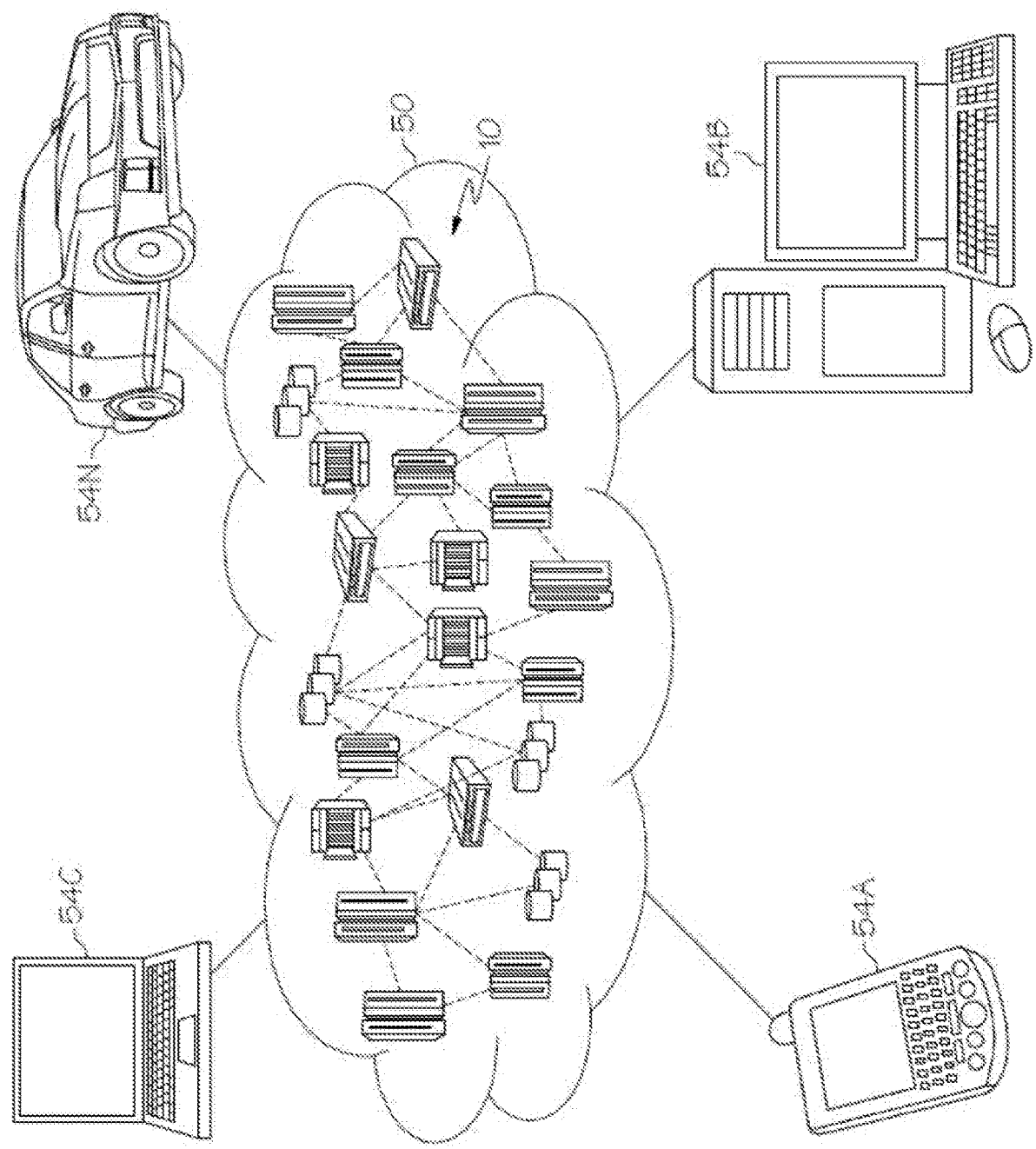
FIG. 1 depicts a cloud computing environment, according to embodiments of the present disclosure.

Testcase workflow assurance across a cloud or other networked environment is provided according to the present disclosure by the creation, deployment, and maintenance of a chain of cryptographic hash artifacts for tasks of interest in the networked environment. As various tasks are completed in the environment, the cryptographic hashes for elements of the tasks (e.g., source code, username (and other user credential information), and time of performance) are stored in a secure database with the hashes of other tasks and related metadata to provide a secure log of how or whether the tasks were performed. For example, in a software test environment, every time a user accesses (reads from or writes to) a tracked file, a cryptographic hash of a user ID, time of access, and the file is written to a secure database to chain together an immutable log of what actions were performed in the test environment. The present disclosure provides for a log of the actions taken (and related metadata) that is both immutable and can be reconstructed to verify whether (and how) various actions took place as alleged, for example, as part of a quality assurance audit.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
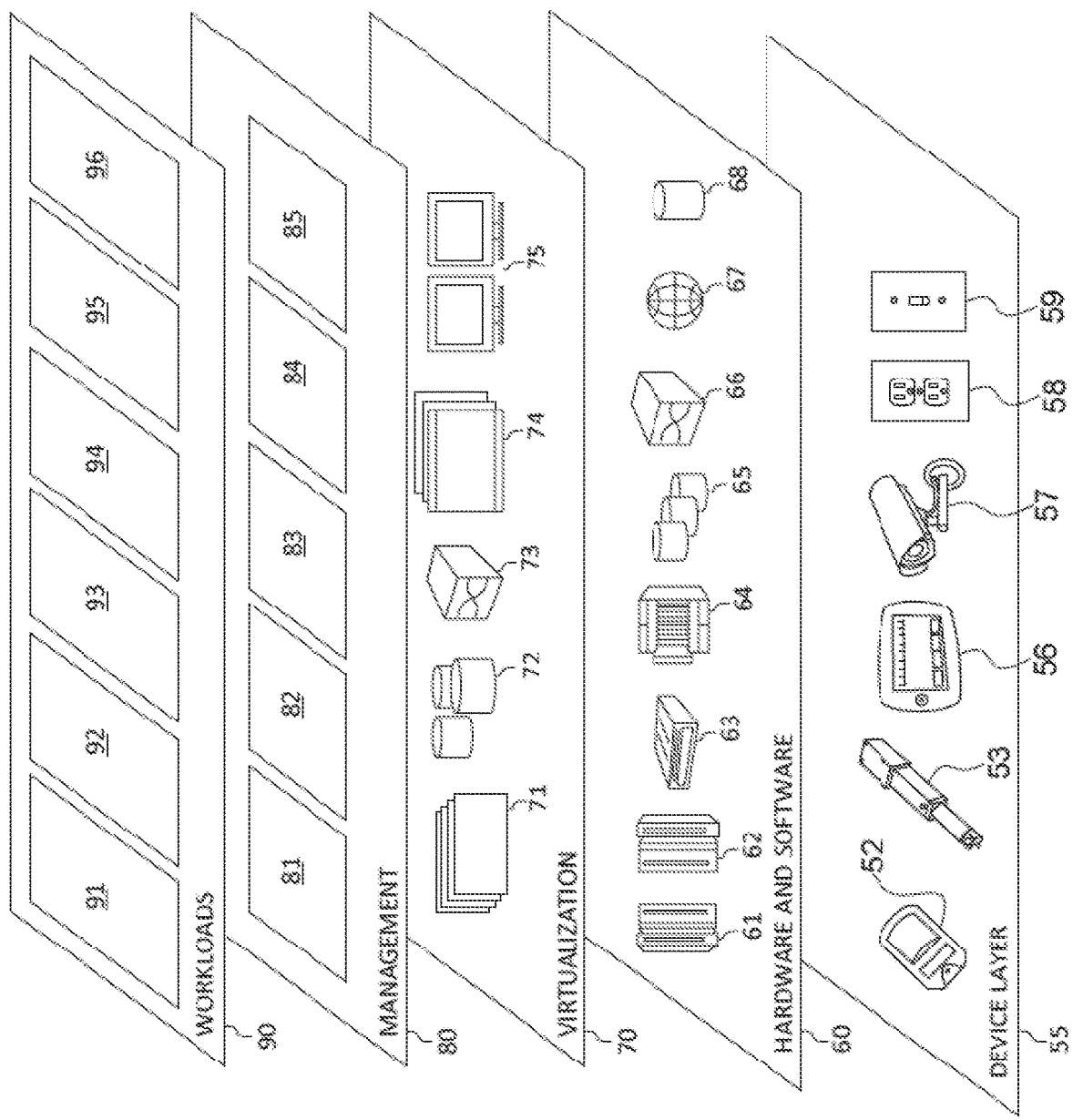
FIG. 2 depicts abstraction model layers, according to embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and class balancing training datasets for intent authoring using search 96.

Figure 3:
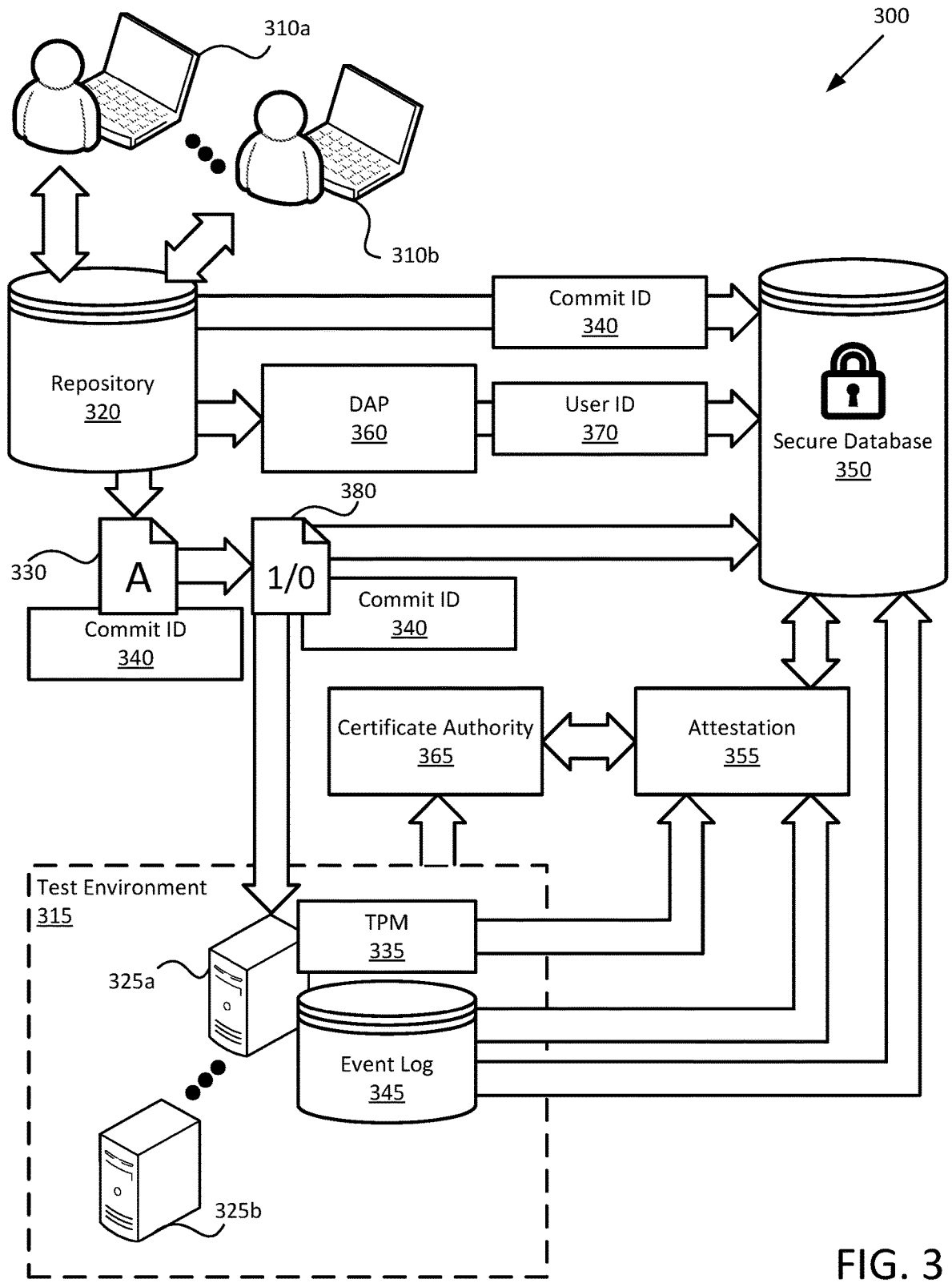
FIG. 3 illustrates an example networked environment, according to embodiments of the present disclosure.

FIG. 3 illustrates an example networked environment 300, according to embodiments of the present disclosure. Various client devices 310a-b (generally, client device 310) connect to a repository 320 where various source files 330 are stored and provided for access and modification to the client devices 310. The client devices 310 may be various computing devices that are connected over a network to a centralized server providing the repository 320.

As users commit changes to the source files 330 (e.g., finalize or upload changes made on the client device 310 to the repository 320) an identifier (ID) for that commit action (also referred to as a commit ID 340) is generated. These commits are logged in a secure database 350, along with the user ID 370 for the user making the commit, as cryptographic hashes. In various embodiments, the user ID 370 is identified via a directory access protocol (DAP) 360.

The secure database 350 maintains an immutable and secure record of various actions taken with respect to a source file 330, including, but not limited to: commits, reads, copy commands, test deployments (including test results), operational deployments, and metadata related to testing conditions (e.g., when the computing device running the test was certified as secure). In some embodiments, the secure database 350 stores the records in a blockchain, which allows for the verifiable reconstruction of the chain when an audit is performed. For example, when auditing the secure database 350 for actions taken between time to and ti, a known-good state of the blockchain at time to and every action alleged to have taken place between times to and ti can be used to reconstruct the blockchain at time ti. If the stored and reconstructed blockchains for time ti match, the auditor can be assured that that alleged actions did take place. In some embodiments, the secure database 350 uses Write Once Read Multiple (WORM) storage media to store the data. In some embodiments, the secure database 350 is a restricted access database that only allows certain designated parties read access, write access, or read-write access to the data stored therein.

The actions and metadata related to those actions can be stored as cryptographic hashes (also referred to as checksums) in the secure database 350. A cryptographic hash is a one-way function that is performed on an input of arbitrary length that produces a fixed length output that cannot (generally) be reverted to the input. By hashing the inputs to the secure database 350, the secure database 350 can obfuscate what inputs are needed to reconstruct a state of the secure database 350 at any given time. Additionally, because the cryptographic hashes are of a known and consistent size, the secure database 350 can allocate memory storage space at a more predictable rate than if data of an arbitrary size were stored in the secure database 350. In various embodiments, the data to be stored in the secure database 350 are sent from the various remote computing devices (e.g., the repository 320) already hashed, while in other embodiments, the data are hashed locally by the computing device providing the secure database 350.

The commit IDs 340 are sent to a secure database 350 to track the different versions of the source file 330 committed by the user to the repository 320, and are included (as hashed) in the test executable 380 generated from the source file 330 that are sent to the test environment 315 when a test is requested on a version of the source file 330. The test executable 380 (including the corresponding commit ID 340) is also supplied to the secure database 350 as a cryptographic hash to store as a record of what executables were supplied to the test environment 315 and when the test request was made.

In various embodiments, the test environment 315 includes one or more test servers 325a-b (generally, test server 325) designated to run a requested test using the test executable 380. In various embodiments, the test servers 325 represent or emulate the computing devices used to provide the executable source file 330 to end users (as a server 63 or virtual server 71 providing a workflow, a voting machine logic control unit, a medical device logic control unit, etc.). The test servers 325 are provided as secure test platforms that include a trusted platform module (TPM) 335 and an event log 345 that provide data of the actions taken.

The TPM 335 is a designated microcontroller on the test server 325 that verifies that the hardware, firmware, and operating systems of the test server 325 have not been tampered with, and are operating as expected. The TPM 335 may operate at boot or startup of the test server 325 to verify the integrity of the hardware and software thereon, and reports the results to an attestation server 355. When the test executable 380 affects the firmware, operating system, or other software verified by the TPM 335, the attestation server 355 compares the cryptographic hashes of the test executable 380 provided to the secure database 350 at build time to verify that the test executable 380 supplied to the test server 325 matches that provided to the secure database 305 (i.e., the test executable 380 has not been substituted before being run on the test server 325). The test environment 315 (or individual test servers 325 therein) enroll with a certificate authority 365 which the attestation server 355 queries to challenge the TPM 335 to ensure that the test server 325 remains secure. In various embodiments, the certificate authority 365 and the attestation server 355 are provided on a separate set of hardware from any of the repository 320, the test environment 315, and the secure database 350 so that audits confirming the test server 325 as secure within the test environment 315 are provided by a trusted third party (e.g., an independent attestation and certification authority) to include in the secure database 350.

The event log 345 logs hashes of the results of the test executable 380, and reports the outputs to the attestation server 355 and the secure database 350. The results reported to the secure database and/or attestations server 355 may include the node ID (e.g., identity of the test server 325 in the test environment 315), a timestamp of when the test occurred, test results/outputs, and the commit ID 340, among other metadata related to the test. In this way, the secure database 350 is provides with information on the actions of interest in verifying that the tests were performed securely, who performed the tests, what the contents and results of the tests were, and when the tests were performed. These data and metadata may be accessed and analyzed (e.g., as part of a quality audit), but are stored in an immutable record in the secure database 350 to assure auditors and concerned parties that the data and metadata have not been tampered with.

Figure 4:
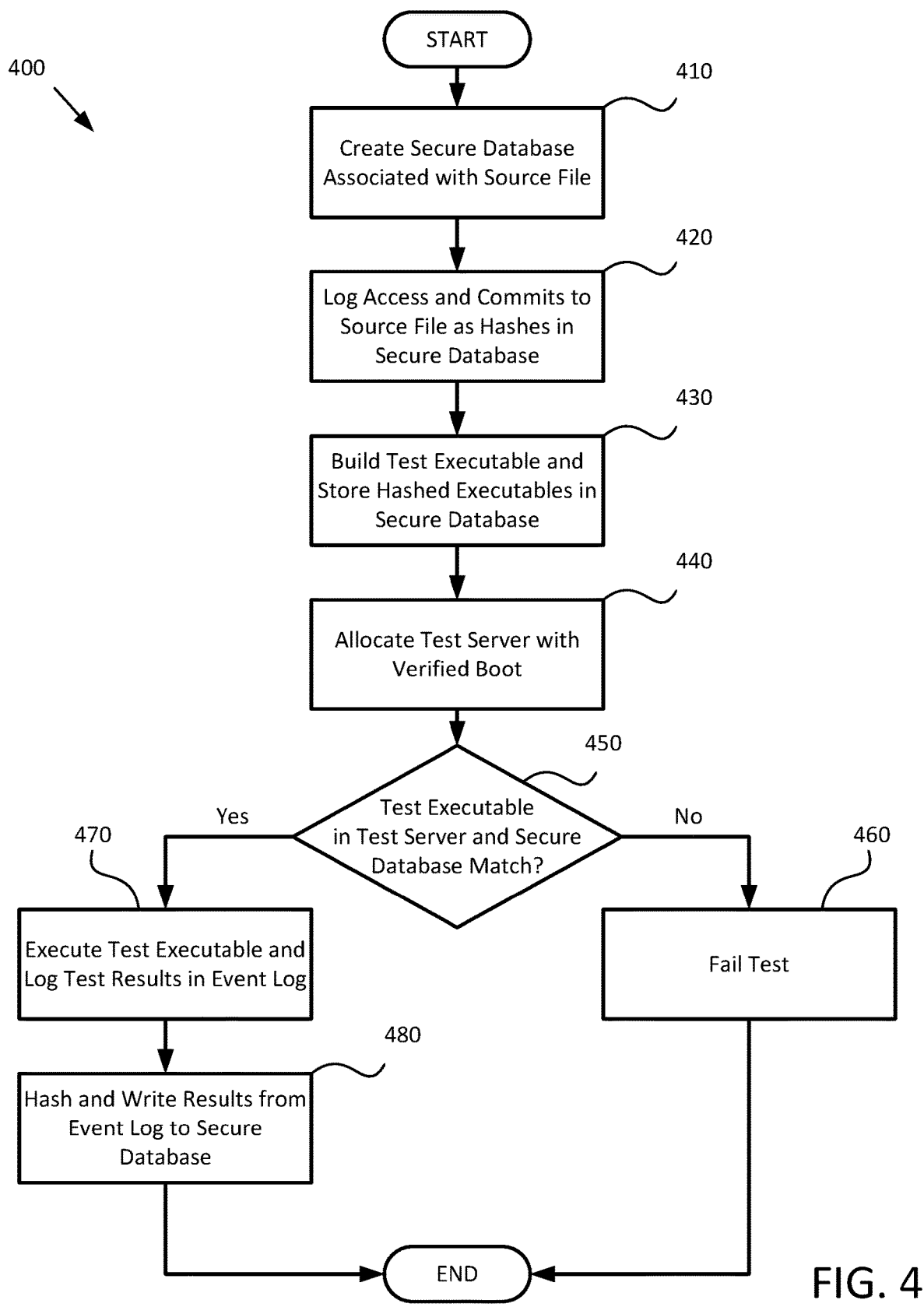
FIG. 4 is a flowchart of a method for testcase workflow assurance, according to embodiments of the present disclosure.

FIG. 4 is a flowchart of a method 400 for testcase workflow assurance, according to embodiments of the present disclosure. Method 400 begins with block 410, where a user requests the creation of a secure database 350 associated with a source file 330. In various embodiments, the secure database 350 is hosted on the same or a different computing device as the repository 320 hosting the source file 330.

At block 420, the repository 320 logs accesses and commits to the source file 330 as hashes in the secure database 350. These commits can include the commit that finalizes the source file 330 for test on a test server 325 that is a different and remote computer from the repository, as well as intermediary commits (e.g., saving work that is not deemed ready for test). For example, in response to receiving an update to the source file 330 on repository 320, the repository 320 hashes the updated conditions of the source file 330 (e.g., changes in content, who made the changes, when the changes were made) and adds the updated conditions as hashes to the secure database 350. Additional data related to which user made the commit (e.g., via a user ID 370), when the commit was made, and an identity of the commit (e.g., a commit ID 340), etc. are included with the data transmitted to the secure database 350.

The secure database 350 can also store records of various designated actions taken in the networked environment 300 regarding the source file 330, which may include, but are not limited to: checking out the source file 330 from the repository 320, committing changes to the source file 330 in the repository 320, creating a branch or new source file 330 in the repository 320, requesting or performing a test of the source file 330, certifying whether the test server 325 is secure to test the source file 330, etc.

At block 430, the repository 320 builds the test executable 380 from the source file 330 and the commit ID 340 and transmits the hashed executables (i.e., the test executable 380 and commit ID 340 as cryptographic hashes) in the secure database 350. Additionally, the repository 320 can provide additional metadata related to the test to the secure database 350 including: which user requested the test (e.g., via a user ID 370), when the test request was made, when the test is scheduled for, whether specific test cases have been requested, etc.

At block 440, the test environment 315 allocates a test server 325 for executing the test executable 380. The test server 325 is verified as secure at boot by a TPM 335 thereon, and the results of the secure boot are provided to the secure database 350 to ensure a record of the secure nature of the test server 325 is recorded. Additionally, other test conditions related to the test server 325 are also provided to the secure database 350, such as, for example, a node ID for the test server 325, a timestamp, the hash of the test executable 380 provided to the test server 325, metadata related to the test, etc.

At block 450, an attestation server 355 compares the test executable 380 supplied to the test server 325 against the test executable 380 provided to the secure database 350. For example, the attestation server 355 may read the hash of the test executable 380 from the secure database 350 and read a hash (using the same cryptographic hash algorithm) of the test executable 380 stored for execution on the test server 325 prior to performing the test to ensure that a malicious party has not substituted the test executable 380 for a different binary/executable at test runtime. When the hashes of the test executables 380 from the secure database 350 and the test server 325 do not match, method 400 proceeds to block 460. Otherwise, when the hashes of the test executables 380 from the secure database 350 and the test server 325 do match, method 400 proceeds to block 470.

At block 460, the attestation server 355 fails the test of the test executable 380. In various embodiments, once the test is failed, the test server 325 may end the test (e.g., to avoid running malicious code), and report to the secure database 350 that the test was failed—indicating in the secure database 350 that a party attempted to interfere with the test or that some other build/test error occurred. In some embodiments, the attestation server 355 generates an alert that can be transmitted to a quality assurance system to alert responsible parties to the failure in test. Method 400 may then conclude.

At block 470, the test server 325 executes the test executable 380 in the requested test and logs the results in the event log 345. Additionally, the event log 345 may include additional test condition data and metadata in the event log 345, including: software configuration information, the commit ID 340, an amount of coverage of the test (positive and negative), a pointer to results stored of the test in a remote computing device (e.g., the repository 320), a link to the version of the source file 330 used in the test, results from the TPM 335, user ID 370 of the person who requested the test, hardware configurations of the test server 325, values for inputs to the source file 330 used during test, etc.

At block 480, the test server 325 hashes the test results and other test condition data stored in the event log 345 and sends the test results to the secure database 350. In various embodiments, the secure database 350 adds the test conditions and the test results (as hashed) to the sequence of tracked actions for the source file 330, which includes a timestamp of when the test was performed and/or added to the secure database 350. In various embodiments in which the secure database 350 includes a blockchain for the source file 330, adding the test results to the secure database 350 is done by adding a new block that includes the designated actions since the last test to the blockchain. Method 400 may then conclude.

Figure 5:
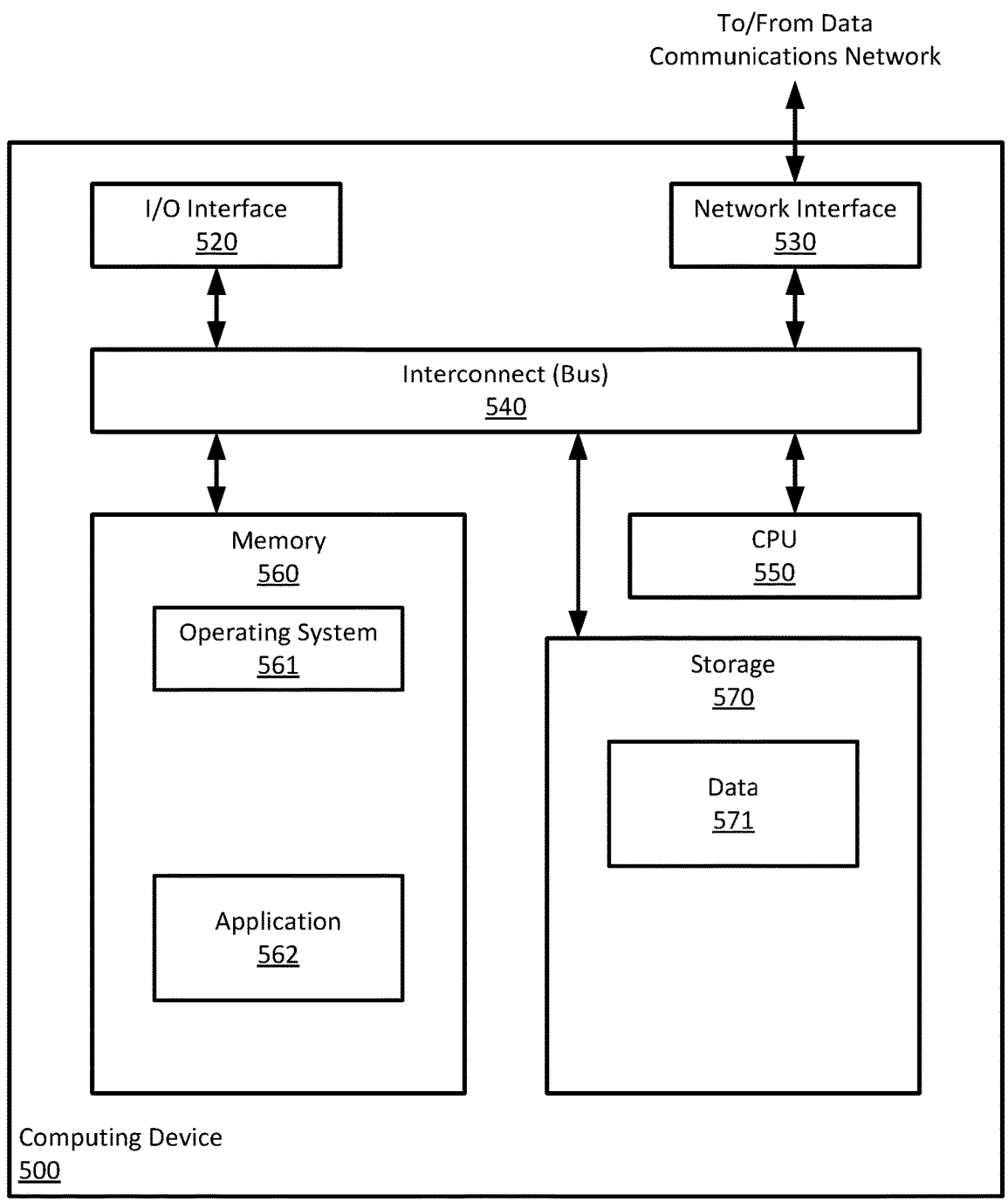
FIG. 5 illustrates a computing system, according to embodiments of the present disclosure.

FIG. 5 illustrates a computing system 500, such as a client device 310, a repository 320, test server 325, secure database 350, etc., according to embodiments of the present disclosure. As shown, the computing system 500 includes, without limitation, a central processing unit (CPU) 550, a network interface 530, an interconnect 540, a memory 560, and storage 570. The computing system 500 may also include an I/O device interface 520 connecting I/O devices 510 (e.g., keyboard, display and mouse devices) to the computing system 500.

The CPU 550 retrieves and executes programming instructions stored in the memory 560. Similarly, the CPU 550 stores and retrieves application data residing in the memory 560. The interconnect 540 facilitates transmission, such as of programming instructions and application data, between the CPU 550, I/O device interface 520, storage 570, network interface or other interconnect 540, and memory 560. CPU 550 is included to be representative of a single CPU, a microprocessor, multiple CPUs, a single CPU having multiple processing cores, and the like. And the memory 560 is generally included to be representative of a random access memory. The storage 570 may be a disk drive storage device. Although shown as a single unit, the storage 570 may be a combination of fixed and/or removable storage devices, such as magnetic disk drives, flash drives, removable memory cards or optical storage, network attached storage (NAS), or a storage area-network (SAN). The storage 570 may include both local storage devices and remote storage devices accessible via the network interface 530. In some embodiments, the storage 570 includes Write Once Read Many (WORM) storage devices to store an immutable record of the data 571 stored thereon.

Further, although shown as a single computing system, one of ordinary skill in the art will recognized that the components of the computing system 500 shown in FIG. 5 may be distributed across multiple computing systems connected by a data communications network.

As illustrated, the memory 560 includes an operating system 561, which may include one or more file systems, and a set of processor instructions to perform various actions as described herein. These actions may be informed and formatted according to various applications 562 (e.g., text editors, action loggers, security programs) running in the memory as instructions executed by the CPU 550.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described above are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed substantially concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   creating a secure database for actions taken regarding a source file that is stored on a first computer;
   receiving, at the secure database from the first computer, a test executable created from at least the source file after the source file is finalized on the first computer for test on a second computer different from the first computer;
   storing, in the secure database, a first hash based on a test environment related to the source file and the second computer;
   in response to determining that a version of the test executable provided to the second computer matches a version of the test executable provided to the secure database:
      receiving, from the second computer, a second hash of test results from testing the test executable on the second computer; and
      storing the second hash in the secure database; and
   in response to receiving a test request for the test executable on the second computer:
      finalizing the source file on the second computer as a second test executable;
      creating a third hash of the second test executable;
      adding the third hash to the secure database;
      providing the second test executable for testing to the second computer; and
      in response to determining that the second test executable provided to the second computer does not match a version of the second test executable provided to the secure database, generating an alert that the source file has been tampered with.

2. The method of claim 1, further comprising, in response to receiving at the secure database an update to the source file from the first computer:
   creating a new hash based on updated conditions of the source file; and
   storing the new hash to the secure database.

3. The method of claim 1, wherein the test environment includes:
   a state of the source file provided for test;
   a user credential information requesting a given action;
   a time for performing the given action; and
   values for inputs to the source file during test.

4. The method of claim 1, wherein the secure database is implemented as a blockchain for the source file, and wherein the blockchain is updated in response to designated actions taken on the first computer and on the second computer with respect to the source file.

5. The method of claim 4, wherein the designated actions include:
   checking out the source file;
   committing changes to the source file;
   requesting a test of the source file;
   performing the test of the source file; and
   certifying the second computer as secure.

6. The method of claim 1, wherein the second computer is certified as a secure test environment by a separate attestation and certification authority, wherein audits confirming the second computer as the secure test environment are included in the secure database.

7. A system, comprising:
   a processor; and
   a memory storage device, including instructions that when executed by the processor perform an operation including:
      creating a secure database for actions taken regarding a source file that is stored on a first computer, wherein the secure database is implemented as a blockchain for the source file and wherein the blockchain is updated in response to designated actions taken on the first computer and on a second computer with respect to the source file;
      receiving, at the secure database from the first computer, a test executable created from at least the source file after the source file is finalized on the first computer for test on the second computer different from the first computer;
      storing, in the secure database, a first hash based on a test environment related to the source file and the second computer; and
      in response to determining that a version of the test executable provided to the second computer matches a version of the test executable provided to the secure database:
         receiving, from the second computer, a second hash of test results from testing the test executable on the second computer; and
         storing the second hash in the secure database.

8. The system of claim 7, wherein the operation further comprises, in response to receiving at the secure database an update to the source file from the first computer:
    creating a new hash based on updated conditions of the source file; and
    storing the new hash to the secure database.

9. The system of claim 7, wherein the operation further comprises, in response to receiving a second test request for the source file on the second computer:
    finalizing the source file for test on the second computer as a second test executable;
    creating a third hash of the second test executable;
    adding the third hash to the secure database;
    providing the second test executable for testing to the second computer; and
    in response to determining that the second test executable provided to the second computer does not match a version of the second test executable provided to the secure database, generating an alert that the source file has been tampered with.

10. The system of claim 7, wherein the test environment includes:
    a state of the source file provided for test;
    a user credential requesting a given action;
    a time for performing the given action; and
    values for inputs to the source file during test.

11. The system of claim 7, wherein the designated actions include:
    checking out the source file;
    committing changes to the source file;
    requesting a test of the source file;
    performing the test of the source file; and
    certifying the second computer as secure.

12. The system of claim 7, wherein the second computer is certified as a secure test environment by a separate attestation and certification authority, wherein audits confirming the second computer as the secure test environment are included in the secure database.

13. A computer program product for verifiable testcase workflow, the computer program product comprising a computer-readable storage medium having program instructions embodied therewith, the program instruction executable by a computer processor to cause the computer processor to:
    create a secure database for actions taken regarding a source file that is stored on a first computer, wherein the secure database is implemented as a blockchain for the source file and wherein the blockchain is updated in response to designated actions taken on the first computer and on a second computer with respect to the source file;
    in response to the first computer finalizing the source file for test as a test executable on the second computer different from the first computer:
        store, in the secure database, a first hash of a test environment related to the source file and the second computer; and
    in response to receiving a second hash of test results from the second computer from executing the test executable on the second computer and in response to determining that a version of the test executable provided to the second computer matches a version of the test executable provided to the secure database:
        store the second hash to the secure database.

14. The computer program product of claim 13, wherein the program instructions are further executable to cause the computer processor to:
    in response to receiving at the secure database an update to the source file from the first computer:
    create a new hash based on updated conditions of the source file; and
    store the new hash to the secure database.

15. The computer program product of claim 13, wherein the program instructions are further executable to cause the computer processor to:
    in response to receiving a second test request for the source file on the second computer:
        in response to the second computer finalizing the source file as a second test executable:
            store a third hash of the second test executable to the secure database; and
            in response to determining that a version of the second test executable provided to the second computer does not match a version of the second test executable provided to the secure database, generate an alert that the source file has been tampered with.

16. The computer program product of claim 13, wherein the test environment includes:
    a state of the source file provided for test;
    a user credential information requesting a given action;
    a time for performing the given action; and
    values for inputs to the source file during test.

17. The computer program product of claim 13, wherein the designated actions include:
    checking out the source file;
    committing changes to the source file;
    requesting a test of the source file;
    performing the test of the source file; and
    certifying the second computer as secure.

\* \* \* \* \*